(12) United States Patent
Zimmer et al.

(10) Patent No.: US 6,633,964 B2
(45) Date of Patent: Oct. 14, 2003

(54) METHOD AND SYSTEM USING A VIRTUAL LOCK FOR BOOT BLOCK FLASH

(75) Inventors: Vincent Zimmer, Federal Way, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 09/823,573

(22) Filed: Mar. 30, 2001

(65) Prior Publication Data

US 2002/0144050 A1 Oct. 3, 2002

(51) Int. Cl.[7] .............................................. G06F 12/14
(52) U.S. Cl. ........................ 711/163; 711/103; 710/200; 713/2
(58) Field of Search ...................... 710/200; 711/103, 711/163, 102; 713/2, 200, 1

(56) References Cited

U.S. PATENT DOCUMENTS

| | | | |
|---|---|---|---|
| 5,704,035 A | 12/1997 | Shipman ...................... 714/42 |
| 5,844,986 A | 12/1998 | Davis ......................... 713/187 |
| 5,890,191 A * | 3/1999 | Espinor et al. .............. 711/103 |
| 5,991,197 A * | 11/1999 | Ogura et al. ............ 365/185.11 |
| 6,009,495 A * | 12/1999 | DeRoo et al. ............... 711/103 |
| 6,031,757 A * | 2/2000 | Chuang et al. ......... 365/185.04 |
| 6,058,048 A | 5/2000 | Kwon .................... 365/185.33 |
| 6,081,664 A | 6/2000 | Nowlin, Jr. ................. 717/127 |
| 6,154,819 A * | 11/2000 | Larsen et al. ............... 711/163 |
| 6,154,837 A | 11/2000 | Fudeyasu et al. .............. 713/3 |
| 6,182,187 B1 | 1/2001 | Cox et al. ....................... 711/5 |
| 6,205,548 B1 * | 3/2001 | Hasbun .......................... 713/2 |

OTHER PUBLICATIONS

Intel 82802AB/82802AC Firmware Hub (FWH) Datasheet—May 1999.

* cited by examiner

Primary Examiner—Gary Portka
(74) Attorney, Agent, or Firm—Blakely, Sokoloff, Taylor & Zafman LLP

(57) ABSTRACT

A method and system using a virtual lock for boot block flash are disclosed in which code from a boot block of a flash memory is executed. The boot block is hardware protected. One or more ancillary boot blocks in the flash memory are locked based on the executed code such that the ancillary boot blocks are virtually hardware locked. The ancillary boot blocks can be virtually hardware locked using a programmable technique.

19 Claims, 5 Drawing Sheets

METHOD AND SYSTEM USING A VIRTUAL LOCK FOR BOOT BLOCK FLASH

FIELD OF THE INVENTION

The present invention relates generally to the field of personal computers. More particularly, the present invention relates to memory management of flash memory storing Basic Input/Output System (BIOS) code or instructions. Specifically, the present invention relates to a method and system using a virtual lock for boot block flash.

BACKGROUND OF THE INVENTION

A flash memory is a popular form of nonvolatile memory that can be erased and reprogrammed in units of memory called blocks. A common use for flash memory is to store the BIOS for a computing system. BIOS is the essential system code or instructions used to control system configuration and to load the operating system for the computing system. In particular, BIOS provides the first instructions a computing system executes when it is first turned on. The regions of BIOS that is first executed when a computing system is first turned is referred to as "recovery BIOS" region. The recovery BIOS region stores recovery or reset code that sets forth how the computing system is to be booted each time the computing system is first turned on. Because this region of BIOS is critical to the computing system, its protection and integrity is essential.

Hence, a computing system must guarantee security and integrity of the recovery BIOS region in flash memory. As such, the recovery BIOS region is hardware protected (e.g., by a user setting a pin via a jumper). In current computing architectures, this region is limited to the first block ("boot block") of the flash memory, which is limited to 64 Kbytes of memory and is the largest block size prescribed by current flash memory technologies. Thus, only the first block can be hardware protected.

Consequently, as computing architectures become more complex, the code and instructions for recovery BIOS can exceed current limits of the 64 Kbytes of hardware protected memory space. Thus, a limitation with current computing systems is that the recovery BIOS region has to fit into a limited amount of memory space to be hardware protected.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and system using a virtual lock for boot block flash are described. In one embodiment, code from a boot block of a flash memory is executed. The boot block is hardware protected. One or more ancillary boot blocks in the flash memory are locked based on the executed code such that the ancillary boot blocks are virtually hardware locked. The ancillary boot blocks can be virtually hardware locked using a programmable technique.

By allowing ancillary boot blocks of flash memory to be virtually hardware locked, a computing system can ensure hardware protection of recovery BIOS beyond the boot block. This allows for larger recovery BIOS to be hardware protected in a flash memory. As such, more drivers, authorization code, or other types of software modules can be added to recovery BIOS thereby providing a wider range of BIOS services than traditional recovery BIOS.

The flash memory locking techniques described herein offers extensibility for recovery BIOS by freeing recovery BIOS size from being limited to hardware constraints. The flash memory locking techniques described herein also combine software techniques and existing hardware techniques in order to maintain a platform view of blocks of flash memory as "locked." In particular, the flash memory locking techniques described herein allows a computing system to maintain hardware-enforced boot block integrity even if the size of recovery BIOS that needs to be protected is greater than the default hardware lock size (i.e., size of the boot block).

The following embodiments can be implemented for new instruction set architectures such as, for example, the Intel® Itanium® microprocessor family, which may have additional software components (e.g., PAL-A) that are required to execute in "recovery mode" or during the "boot process." Hence, the following embodiments overcome the disadvantages of "boot block" size being predicated on smaller and simpler instruction set architectures or legacy BIOS requirements.

Figure 1:
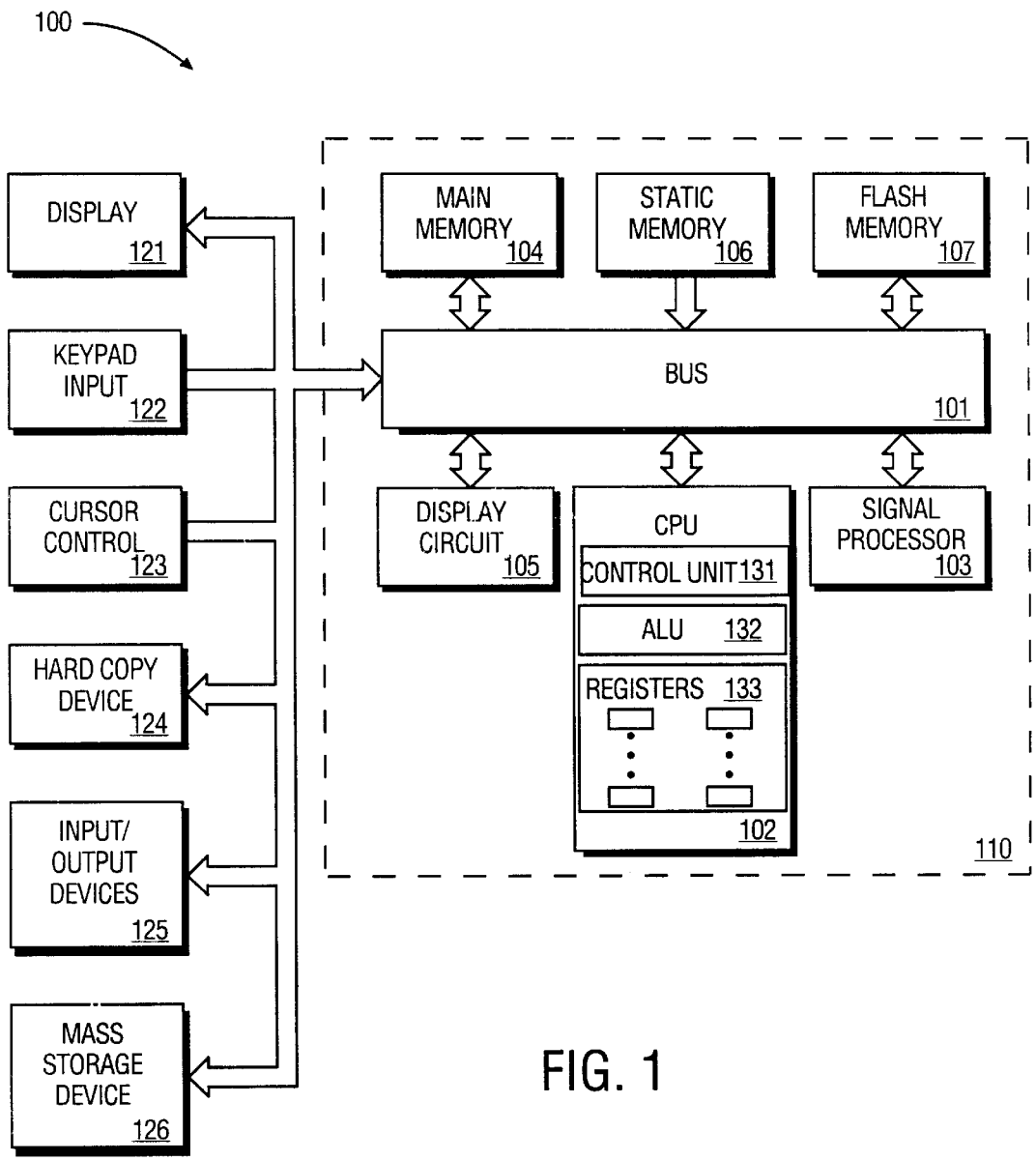
FIG. 1 illustrates an exemplary computing system in which the present invention can be implemented.

FIG. 1 illustrates an exemplary computing system 100 in which the present invention can be implemented. The memory locking techniques described herein for BIOS can be implemented and utilized within computing system 100, which can represent a general purpose computer, portable computer, hand-held electronic device, or other like device. The components of computing system 100 are exemplary in nature in which one or more components can be omitted or added. For example, one or more input/output (I/O) devices or memory devices (not shown) can be added to computing device 100.

Referring to FIG. 1, computing system 100 includes a main unit 110 having a central processing unit (CPU) 102 and a signal processor 103 coupled to a display circuit 105, main memory 104, static memory 106, and flash memory 107 via bus 101. Signal processor 103 can operate as a co-processor with CPU 102. Signal processor 103 can be an optional processing unit within computing system 100. Main unit 110 of computing system 100 can also be coupled to a display 121, keypad input 122, cursor control 123, hard copy device 124, input/output (I/O) devices 125, and mass storage device 126 via bus 101.

Bus 101 is a standard system bus for communicating information and signals. CPU 102 and/or signal processor 103 are processing units for computing system 100. CPU 102 or signal processor 103 or both can be used to process information and/or signals for computing system 100. CPU 102 can be used to process code or instructions to perform the memory locking techniques described herein. Alternatively, signal processor 103 can be used to process code or instructions to perform the memory locking techniques described herein. CPU 102 includes a control unit 131, an arithmetic logic unit (ALU) 132, and several registers 133, which can be used by CPU 102 to process information and/or signals and to perform the memory locking techniques described herein. Signal processor 103 can also include similar components as CPU 102.

Main memory 104 can be, e.g., a random access memory (RAM) or some other dynamic storage device, for storing information or instructions (program code), which are used by CPU 102 or signal processor 103. For example, main memory 104 may be used to store an operating system. Main memory 104 may also store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103.

Flash memory 107 is nonvolatile memory device that can be erased and reprogrammed in units of memory called blocks. Flash memory 107 stores BIOS code or instructions for computing system 100. The BIOS stored in flash memory 107 can be altered. As will be explained in further detail below in connection with the following embodiments, a boot block and ancillary boot blocks can be protected such that the BIOS code stored in those regions cannot be changed or altered. For instance, code or instructions for recovery BIOS can be stored in the boot block and ancillary boot blocks beyond a 64 Kbyte size.

Display 121 can be, e.g., a cathode ray tube (CRT) or liquid crystal display (LCD). Display 121 can display information or graphics to a user. Computing system 101 can interface with display 121 via display circuit 105. Keypad input 122 is an alphanumeric input device for communicating information and command selections to computing system 100. Cursor control 123 can be, e.g., a mouse, a trackball, or cursor direction keys, for controlling movement of an object on display 121. Hard copy device 124 can be, e.g., a laser printer, for printing information on paper, film, or some other like device. Input/output (I/O) devices 125 can represent any number of I/O devices that can be coupled computing system 100. For example, a digital camera can be coupled to computing system 100 as an I/O device. Mass storage device 126 can be a storage device such as a read/writable compact disc (CD) or digital video disk (DVD) drive.

The memory locking techniques described herein can be implemented by hardware and/or software contained within computing system 100. For example, CPU 102 can execute BIOS code in flash memory 107 to lock virtually ancillary boot blocks such that they are virtually hardware protected. Alternatively, CPU 102 can execute code in another memory device or machine-readable medium to lock ancillary boot blocks in flash memory 107. Such a machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 2A:
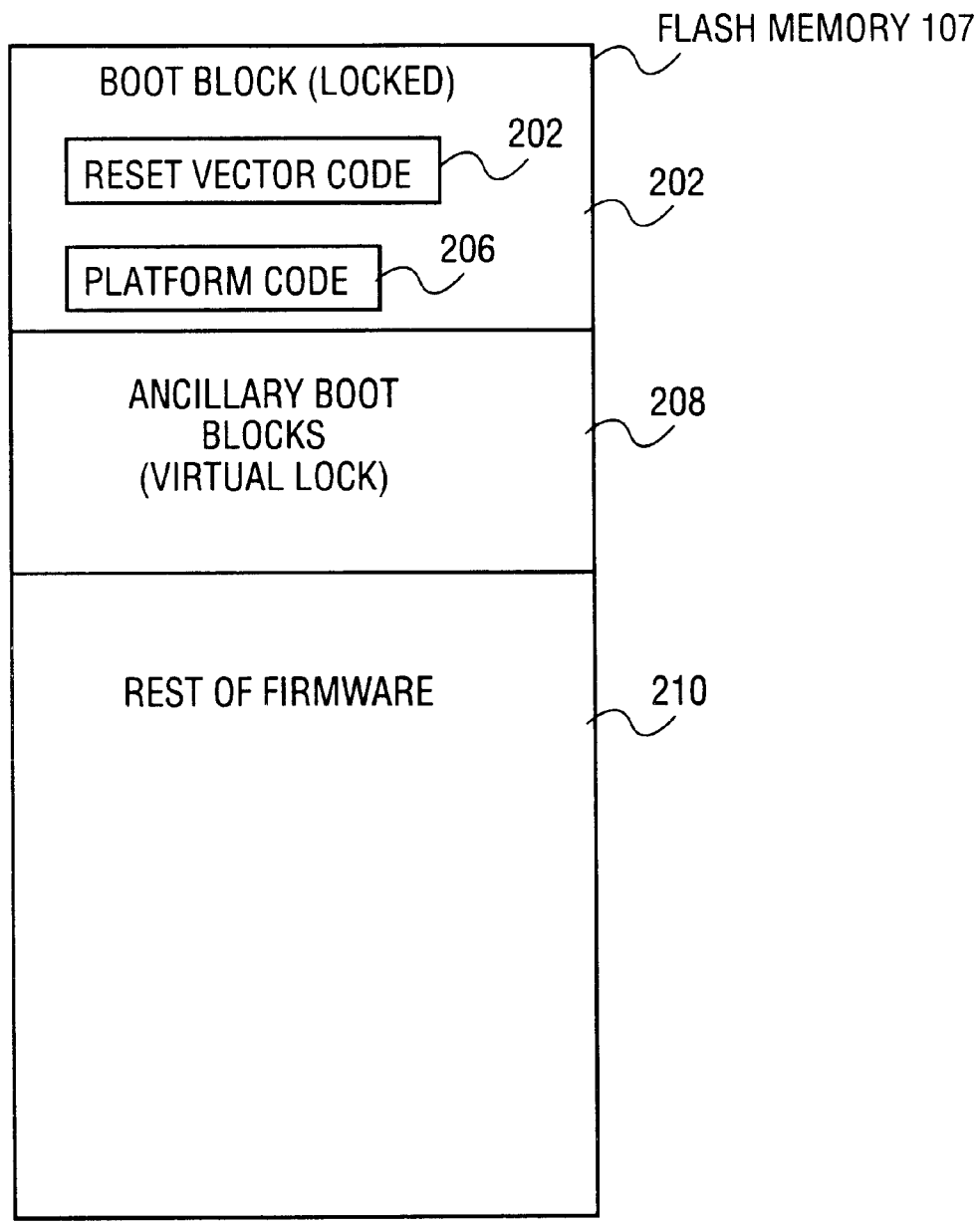
FIG. 2A illustrates a block diagram of a flash memory having ancillary boot blocks that are virtually hardware locked according to one embodiment.

FIG. 2A illustrates a block diagram of flash memory 107 having ancillary boot blocks 208 that are virtually hardware locked according to one embodiment. In one embodiment, flash memory 107 is an Intel® family type flash memory device that can store BIOS used by Intel® family of microprocessor architectures. For example, flash memory 107 can be included within an Intel® firmware hub (FWH).

As part of a FWH, an integrated command user interrface (CUI) can be provided for flash memory 107 to request access to locking, programming, and erase options. FWH provides a series of registers used for software read and write locking features. As will be described in further detail below, the CUI can be used to lock programmatically ancillary boot blocks 208 of flash memory 107 using block locking register 250 shown in FIG. 2B. Thus, ancillary boot blocks 208 can be virtually hardware protected within computing system 100.

Referring to FIG. 2A, flash memory 107 includes a boot block (hardware locked) and ancillary boot blocks 208 (virtual lock) that store recovery BIOS for computing system 100. Flash memory 107 also includes rest of firmware 210, which stores main sections of BIOS. In one embodiment, the BIOS stored in flash memory 107 is compressed or partially compressed.

Boot block 202 includes reset vector code 202 and platform code 206 that are executed when computing system 100 is first turned on. Flash memory 107 can be preconfigured or programmed with reset vector code 202 and platform code 206. In one embodiment, CPU 102 executes the instructions in reset vector code 202 and platform code 206 for computing system 100.

Reset vector code 202 provides initial instructions to load BIOS for computing system 100. In one embodiment, reset vector code 202 passes control to platform code 206, which in turn provides instructions to determine the size of the recovery BIOS in flash memory 107. If the size of the recovery BIOS is beyond boot block 202, platform code 206 provides instructions to lock additional boot blocks (i.e., ancillary boot blocks 208) for flash memory 107 using a programming technique. By executing platform code 206, computing system 100 can guarantee a chain of trust to ensure the protection and integrity ancillary boot blocks 208.

Figure 2B:
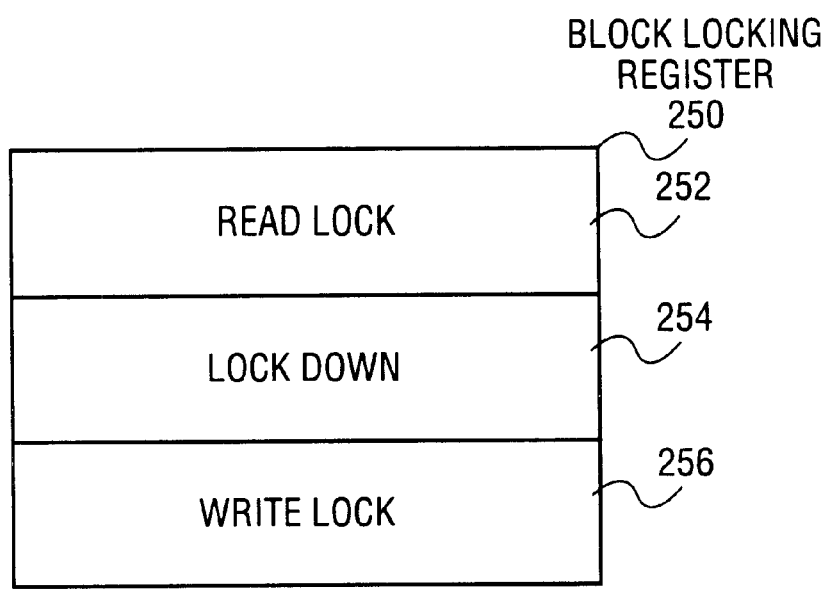
FIG. 2B illustrates a block diagram of a block locking register for the flash memory of FIG. 2A according to one embodiment.

FIG. 2B illustrates a block diagram of a block locking register 250 for flash memory 107 of FIG. 2A according to one embodiment. In one embodiment, block locking register 250 is part of an Intel® FWH to lock flash memory 107. Block locking register 250 can represent a block locking register for each block of flash memory 107. Referring to FIG. 2B, block locking register 250 includes a read lock bit 252, lock down bit 254, and write lock bit 256. The read lock bit 252 can be set to prevent read operations in the block where set. The lock down bit 254 can be set to prevent further set or clear operations to write lock bit 256 or read lock bit 252. The write lock bit 256 can be set to prevent normal program or erase operations in the block where set.

Figure 3:
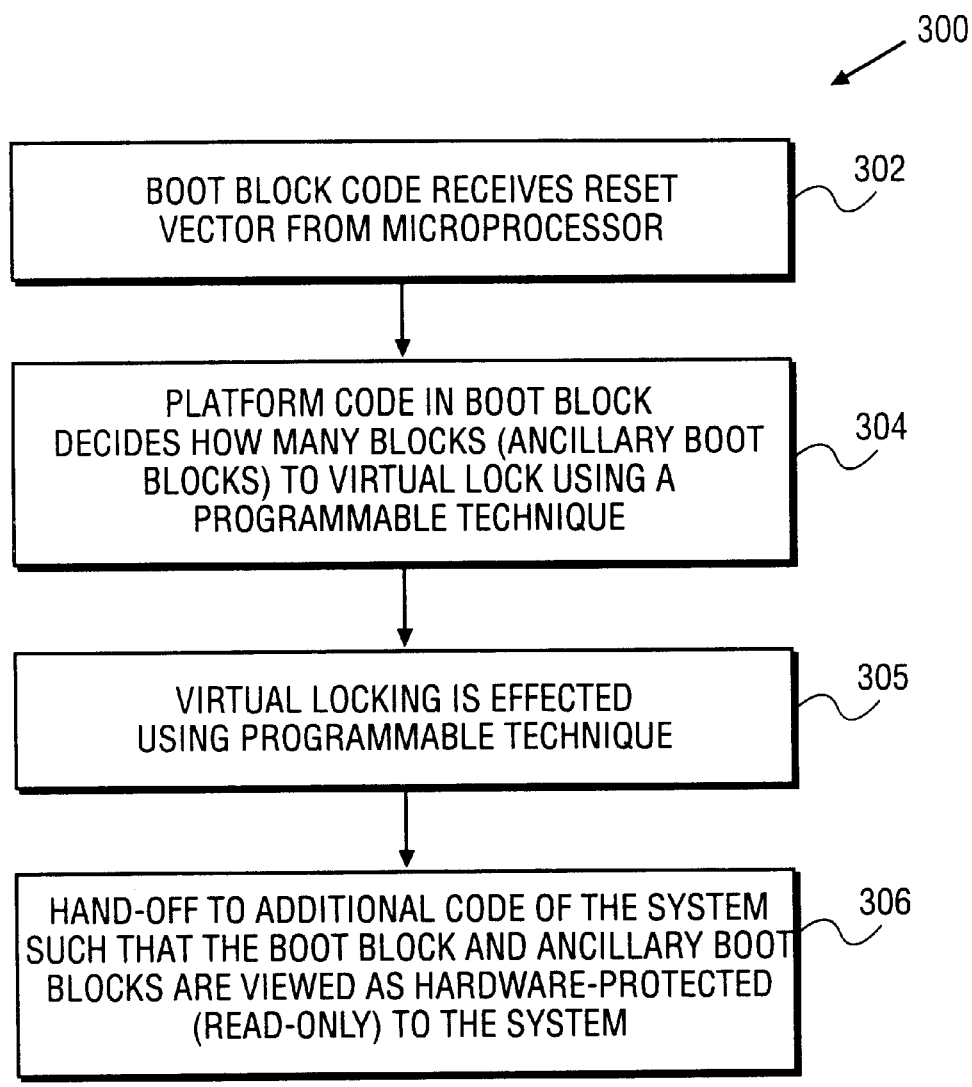
FIG. 3 illustrates a flow diagram of an operation to lock ancillary boot blocks in a flash memory according to one embodiment.

FIG. 3 illustrates a flow diagram of an operation 300 to lock ancillary boot blocks 208 in flash memory 107 according to one embodiment. Initially, operation 300 begins at operation 302.

At operation 302, boot block 202 receives a reset vector CPU 102 (e.g., during a boot process) that initiates reset vector code 202. CPU 102 executes instructions in reset vector code 202 to load BIOS for computing system 100.

At operation 304, CPU 102 executes platform code 206. In one embodiment, platform code 206 embodies a platform policy decision, which can be hard-coded in BIOS at build-time or calculated by a run-time decision process to ascertain the number of additional blocks (i.e., ancillary boot blocks 208) to lock "virtually" using a programmable technique.

At operation 305, virtual locking is effected for ancillary boot blocks 208 within flash memory 107 using a programmable technique supported by flash memory 107. For example, the bits in block locking register 250 can be programmed to lock ancillary boot blocks 208 as will be explained in further detail below. Furthermore, in one embodiment, N * (64 Kbytes) of flash memory can be locked for the recovery BIOS where N is an integer.

At operation 306, the boot process is to hand-off to additional code for computing system 100 such that boot block 202 and ancillary blocks 208 are viewed as hardware-protected (i.e., read-only) within computing system 100.

Figure 4:
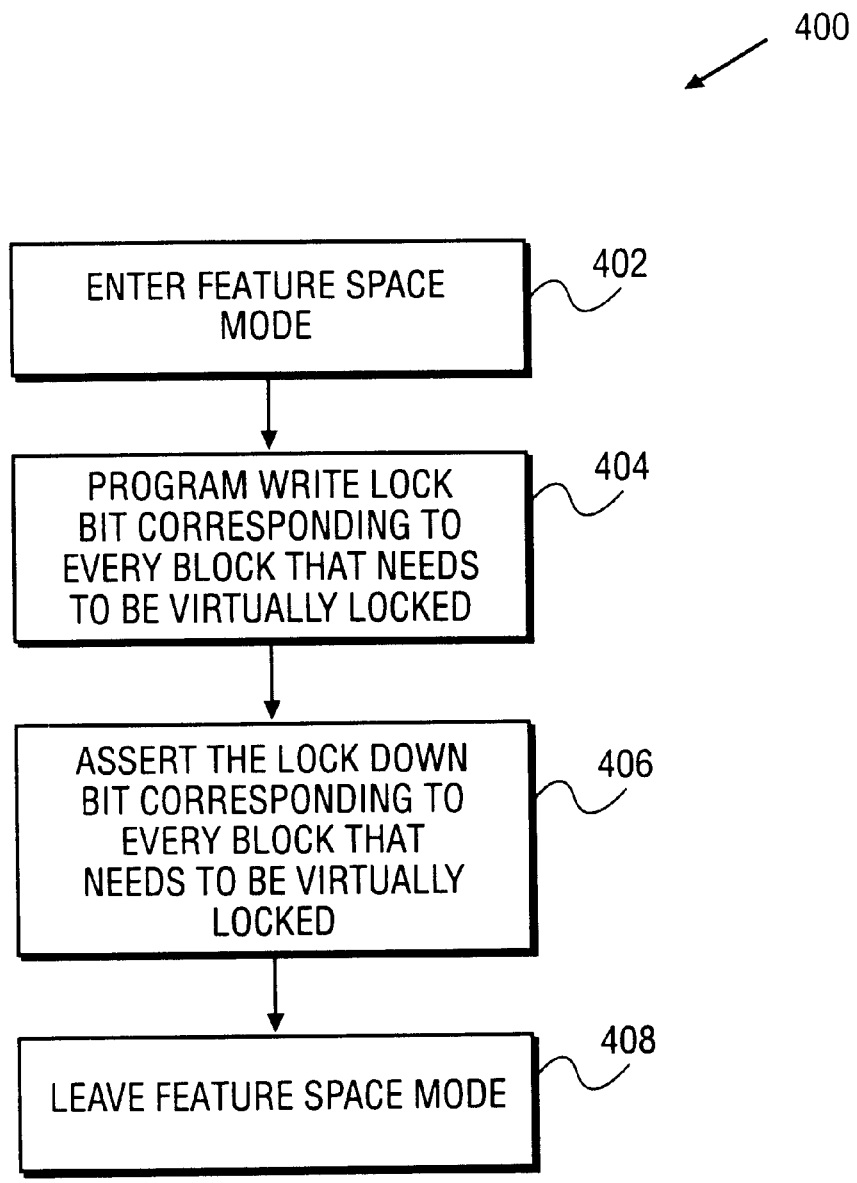
FIG. 4 illustrates a detailed flow diagram of an operation programming a block locking register for a flash memory as ancillary boot blocks according to one embodiment.

FIG. 4 illustrates a detailed flow diagram of an operation 400 programming block locking register 250 in flash memory 107 to lock blocks in a flash memory as ancillary boot blocks 208 according to one embodiment. Initially, operation 400 begins at operation 402.

At operation 402, a "feature space mode" is entered from the CUI. For example, the CUI provides a set of commands, which include "read," "block erase," "read status," "open feature space," and other commands as part of the FWH.

The feature space mode can be entered into by executing the open feature space command. In one embodiment, flash memory 108 offers a register based locking at a block level in the feature space mode by using block locking register 250. In one embodiment, for each block, a block locking register 250 can be programmed to lock the block. In the feature space mode, block locking register 250 can be programmed to lock a block for flash memory 107. By programming block locking register 250, ancillary boot blocks 208 can be virtually hardware locked.

At operation 404, the write lock bit 256 is set ("programmed") in block locking register 250 corresponding to each block that needs to be virtually locked. The write lock bit 256 if set disables writes to the associated block in flash memory 107.

At operation 406, the lock down bit 254 corresponding to every block that needs to be virtually locked is set or programmed. If set, the lock down bit 254 is critical for "virtual locking." For instance, if the lock down bit 254 is set and the write lock bit 256 is already set, the bits cannot be changed until computing system 100 is restarted.

Virtual locking can thus be performed by being done early in a boot process such that writes cannot be performed to blocks falling under "virtual lock." Furthermore, if the lock down bit 254 is not set, computing system 100 can remove read and write locks previously set by read lock bit 252 and write lock bit 256 by entering feature space mode.

At operation 408, feature space mode is exited. The operation of 400 can be initiated by platform code 206 within boot block 206 of flash memory 107.

Thus, a method and system using a virtual lock for boot block flash have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for a flash memory comprising:
executing code from a boot block of the flash memory, the boot block being hardware locked; and
locking one or more ancillary boot blocks in the flash memory based on the executed code such that the ancillary blocks are virtually hardware locked.

2. The method of claim 1, wherein the locking of the one or more ancillary boot blocks in the flash memory includes locking the one or more ancillary boot blocks using a programmable technique.

3. The method of claim 1, wherein the locking of the one more ancillary boot blocks includes:
determining size of recovery basic input/output system (BIOS) stored in the flash memory; and
locking a number of blocks in the flash memory as the ancillary boot blocks based on the determined size of the recovery BIOS.

4. The method of claim 1, wherein the locking of the one or more ancillary boot blocks in the flash memory includes programming a write lock bit related to the flash memory.

5. The method of claim 1, wherein the boot block and the ancillary boot blocks are read-only.

6. A computing system comprising:
a flash memory having a boot block to store code, the boot block being hardware locked; and
a processor to execute the code stored in the boot block and to lock one or more ancillary boot blocks in the flash memory based on the executed code such that the ancillary blocks are virtually hardware locked.

7. The computing system of claim 6, wherein the processor is to lock the one or more ancillary boot blocks using a programmable technique.

8. The computing system of claim 6, wherein the processor is to determine size of recovery basic input/output system (BIOS) stored in the flash memory and to lock a number of blocks in the flash memory as the ancillary boot blocks based on the determined size of the recovery BIOS.

9. The computing system of claim 6, wherein the processor is to program a write lock bit related to the flash memory.

10. The computing system of claim 6, wherein the boot block and the ancillary boot blocks are read-only.

11. A flash memory device comprising:
a boot block, the boot block being hardware locked; and
one or more ancillary boot blocks, the ancillary boot blocks being virtually hardware locked, wherein the boot block includes code that is to be executed to lock the ancillary boot blocks.

12. The flash memory device of claim 11, wherein the ancillary boot blocks are virtually hardware locked using a programmable technique.

13. The flash memory device of claim 11, wherein the boot block and the ancillary boot blocks store a recovery basic input/output system (BIOS).

14. The flash memory device of claim 11, wherein the boot block and the ancillary boot blocks are read-only.

15. A machine-readable medium providing instructions, which if executed by a processor, causes the processor to perform an operation comprising:
executing code from a boot block of a flash memory, the boot block being hardware locked; and
locking one or more ancillary boot blocks in the flash memory based on the executed code such that the ancillary blocks are virtually hardware locked.

16. The machine-readable medium of claim 15, further providing instructions, which if executed by the processor, causes the processor to perform an operation comprising:
locking the one or more ancillary boot blocks using a programmable technique.

17. The machine-readable medium of claim 15, further providing instructions, which if executed by the processor, causes the processor to perform an operation comprising:
determining size of recovery basic input/output system (BIOS) stored in the flash memory; and locking a number of blocks in the flash memory as the ancillary boot blocks based on the determined size of the recovery BIOS.

18. The machine-readable medium of claim 15, further providing instructions, which if executed by the processor, causes the processor to perform an operation comprising:

programming a write lock bit related to the flash memory.

19. The machine-readable medium of claim 18, further providing instructions, which if executed by the processor, causes the processor to perform an operation comprising:

programming the write lock bit in a register related to the flash memory.

\* \* \* \* \*